United States Patent
Gandotra et al.

(10) Patent No.: US 9,760,666 B1
(45) Date of Patent: Sep. 12, 2017

(54) APPARATUS AND METHOD FOR COLLABORATIVE ADAPTATION OF HIERARCHICALLY-DESIGNED SCHEMATICS TO VARIANT DESIGN REQUIREMENTS

(71) Applicant: CADENCE DESIGN SYSTEMS, INC., San Jose, CA (US)

(72) Inventors: Shilpa Gandotra, New Delhi (IN); Aditya Chandra, Delhi (IN); Gunjan Goel, Uttar Pradesh (IN); Inderpal Singh, Punjab (IN); Nikhil Gupta, New Delhi (IN); Ishani Jain, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/169,239

(22) Filed: May 31, 2016

(51) Int. Cl.
*G06F 17/50* (2006.01)
*H05K 3/00* (2006.01)

(52) U.S. Cl.
CPC ....... *G06F 17/5045* (2013.01); *H05K 3/0005* (2013.01); *G06F 2217/74* (2013.01)

(58) Field of Classification Search
CPC .................................................. G06F 17/5045
USPC ....................................................... 716/102
See application file for complete search history.

(56) References Cited

U.S. PATENT DOCUMENTS

| | | | | |
|---|---|---|---|---|
| 8,645,894 B1* | 2/2014 | Kukal | ................. | G06F 17/5068 716/100 |
| 8,751,985 B1* | 6/2014 | Puri | .................... | G06F 17/5081 716/106 |
| 8,856,714 B2* | 10/2014 | Hwang | ............... | G06F 17/5077 700/118 |
| 2009/0064076 A1* | 3/2009 | Ladin | .................... | G06F 3/0482 716/119 |
| 2013/0152030 A1* | 6/2013 | Drane | ................... | G06F 17/505 716/104 |
| 2013/0263078 A1* | 10/2013 | Jeong | .................. | G06F 17/5081 716/136 |

* cited by examiner

*Primary Examiner* — Suresh Memula
(74) *Attorney, Agent, or Firm* — Rosenberg, Klein & Lee

(57) ABSTRACT

A planned schematic for an electronic system is hierarchically divided into base-level schematic blocks which may be designed individually. In accordance with a plurality of sets of design requirements, variant overlays are designed for each base-level schematic block, each overlay including variant parameter values which may replace corresponding parameter values of the schematic blocks. The schematic blocks are integrated to generate a system-level schematic, and the variant overlays for a given set of design requirements are merged to generate a system variant overlay. Parameter values of the system variant overlay may then replace corresponding parameter values of the system-level schematic to generate a variant schematic for the given set of design requirements. Using this system and methodology, variant designs may be collaboratively generated by multiple designers each with expertise in particular schematic blocks and/or variant requirements, and may be shared either at the system level or at lower levels.

20 Claims, 13 Drawing Sheets

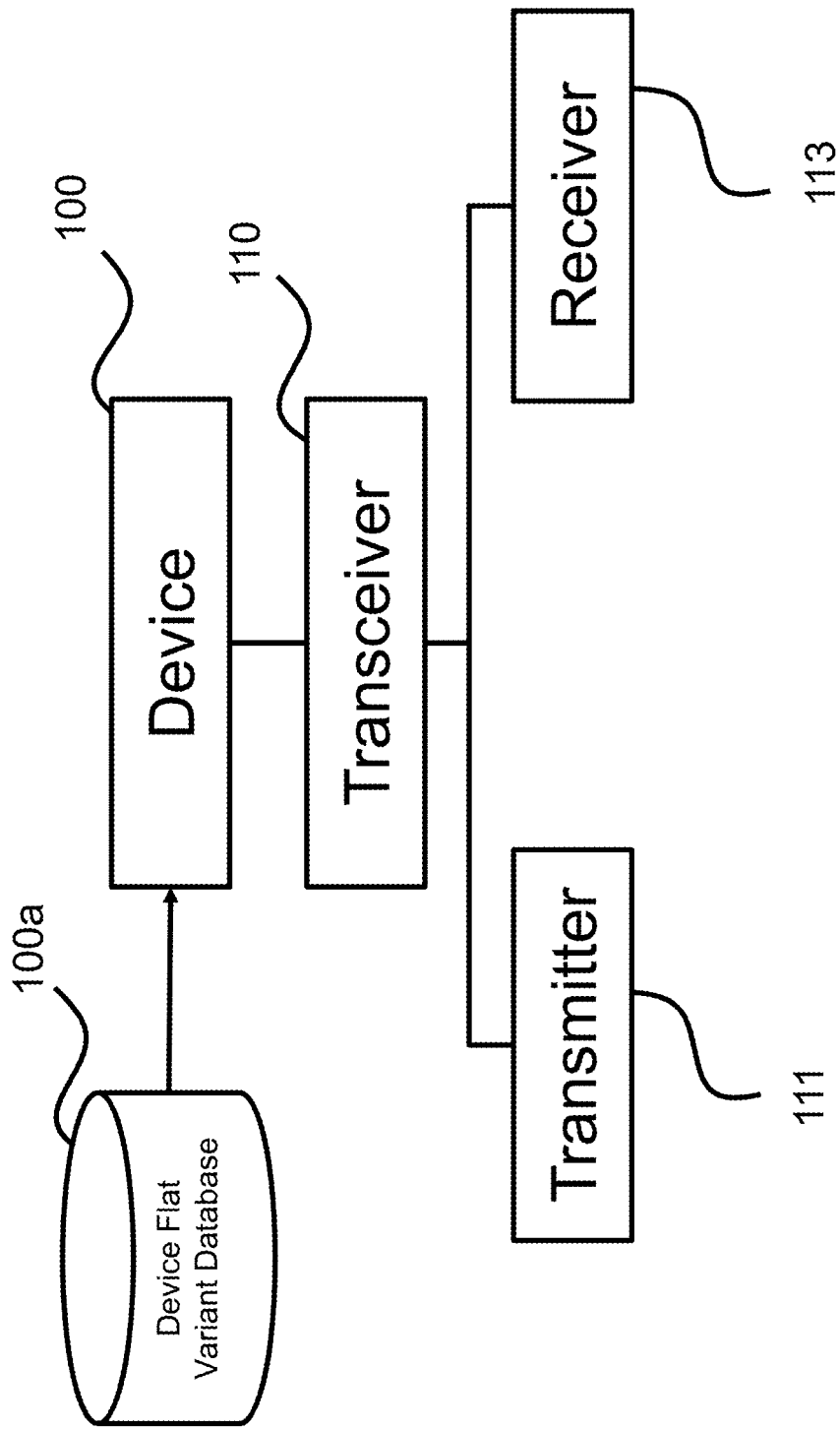

US 9,760,666 B1

APPARATUS AND METHOD FOR COLLABORATIVE ADAPTATION OF HIERARCHICALLY-DESIGNED SCHEMATICS TO VARIANT DESIGN REQUIREMENTS

BACKGROUND OF THE INVENTION

The subject system and method are generally directed to adapting electronic schematics to differing design requirements.

An electronic system or device may be intended for use under multiple design requirements which require small changes to certain design parameters. For instance, a device operating on a standard power supply may need to be adapted for different voltages depending on the country or region of use, or a controller for a vehicle may have a slightly different operation depending on the specific vehicle model and options. In these cases, the necessary changes may be sufficiently minor that it is more efficient to alter the original design for the device into a "variant" system design (or, simply, a "system variant"), rather than starting over.

A design project may be divided into smaller, "lower-level" elements. For example, a smartphone design may be divided into the CPU, memory, power supply, and so forth. These elements may also be divided even further, in a hierarchical manner. Smaller teams of engineers may then each focus on designing a smaller schematic, or schematic block, for one of these elements, and their element designs may be integrated by a system-level designer to form a complete system design. Along with the collaborative and concurrent design advantages of this approach, the schematics for the smaller elements may be reused in other designs requiring similar elements, or in multiple places in the same design if an element is duplicated.

However, the advantage of this collaboration becomes a disadvantage when variants are also employed. The system variant is only helpful to the present schematic and not to other schematics using only elements of the present schematic. More importantly, if an individual element in the design is changed after variants are prepared, those variants may become inapplicable, forcing the system-level designer to start over.

There is therefore a need for a system and a methodology that allows for efficient coordination between low-level design teams and the variant design team.

There is also a need for a system and a methodology that allows for the variant design to automatically adjust to changes in the designs of the low-level elements.

SUMMARY OF THE INVENTION

It is an object of the disclosed system and method to reflect changes to a low-level element of a design in the top-level variant of the design without manual review.

It is another object of the disclosed system and method to allow for efficient sharing of variant data between all levels of a distributed, hierarchical design team.

It is yet another object of the disclosed system and method to efficiently merge variant data from different projects and teams thereof.

These and other objects may be attained in an apparatus and method for collaborative adaptation of hierarchically-designed schematics to variant design requirements. While not limited thereto, a disclosed embodiment is directed to a system for adapting a root system-level schematic representation of an electronic system to at least one variant set of design requirements, where the root system-level schematic hierarchically defines a plurality of base-level schematic blocks each including at least one component and at least one parameter.

In certain embodiments, the system includes a variant editor executable to generate a plurality of block variant overlays. Each block variant overlay may be associated with one of the variant sets of design requirements and one of the base-level schematic blocks of the root system-level schematic, and may define at least one variant parameter value for the associated base-level schematic block according to the associated variant set of design requirements.

In certain embodiments, the system includes an integrator module executable to block variant overlays associated with the same variant set of design requirements to generate a system variant overlay, and to assign the variant parameter values of the system variant overlay to the corresponding parameters of the root system-level schematic to generate a variant system-level schematic associated with the variant set of design requirements. The system variant overlay may include all variant parameter values of the merged block variant overlays, and be associated with the variant set of design requirements.

In certain embodiments, the system includes at least one memory defining at least one system-level variant database. The system-level variant database may store the system variant overlays.

While not limited thereto, another disclosed embodiment is directed to a system for generating a plurality of system-level schematics representation of electronic systems, where the system-level schematics share a hierarchy defining a plurality of base-level schematic blocks, and where each system-level schematic is adapted to one of a plurality of variant sets of design requirements.

In certain embodiments, the system includes a schematic editor executable to generate a plurality of base-level schematic block shared by the plurality of system-level schematics. Each base-level schematic block may include at least one component and at least one parameter.

In certain embodiments, the system includes a variant editor executable to generate a plurality of block variant overlays. Each block variant overlay may be associated with one of the variant sets of design requirements and one of the base-level schematic blocks of the system-level schematics, and may define at least one variant parameter value for the associated base-level schematic block according to the associated variant set.

In certain embodiments, the system includes an integrator module executable to integrate the base-level schematic blocks to generate a root system-level schematic including the components of each of the base-level schematic blocks, to merge the block variant overlays associated with the same variant set of design requirements to generate a system variant overlay, and to assign the parameter values of the system variant overlay to the corresponding parameters of the root system-level schematic to generate a variant system-level schematic associated with the variant set of design requirements. The system variant overlay may include all variant parameter values of the merged block variant overlays, and be associated with the variant set of design requirements.

In certain embodiments, the system includes at least one memory defining at least one system-level variant database. The system-level variant database may store the system variant overlays.

While not limited thereto, another disclosed embodiment is directed to a method for adapting a root system-level schematic representation of an electronic system to at least one variant set of design requirements, where the root system-level schematic is hierarchically defines a plurality of base-level schematic blocks each including at least one component and at least one parameter.

In certain embodiments, the method includes generating at least one block variant overlay associated with one of the variant sets of design requirements and one of the base-level schematic blocks of the system-level schematic. The block variant overlay may define at least one variant parameter value for the associated base-level schematic block according to the associated variant set of design requirements.

In certain embodiments, the method includes merging the at least one block variant overlay associated with the variant set of design requirements to generate a system variant overlay. The system variant overlay may include all variant parameter values of the merged block variant overlays, and may be associated with the variant set of design requirements.

In certain embodiments, the method includes assigning the parameter values of the system variant overlay to the corresponding parameters of the root system-level schematic to generate a variant system-level schematic associated with the variant set of design requirements.

Additional aspects, details, and advantages of the disclosed system and method will be set forth, in part, in the description and figures which follow.

BRIEF DESCRIPTION OF THE DRAWINGS

FIG. 1B is a transceiver branch of the tree diagram of FIG. 1A, further depicting the application of one or more variant overlays from a database to the system-level schematic.

DETAILED DESCRIPTION OF THE PREFERRED EMBODIMENTS

Figure 1A:
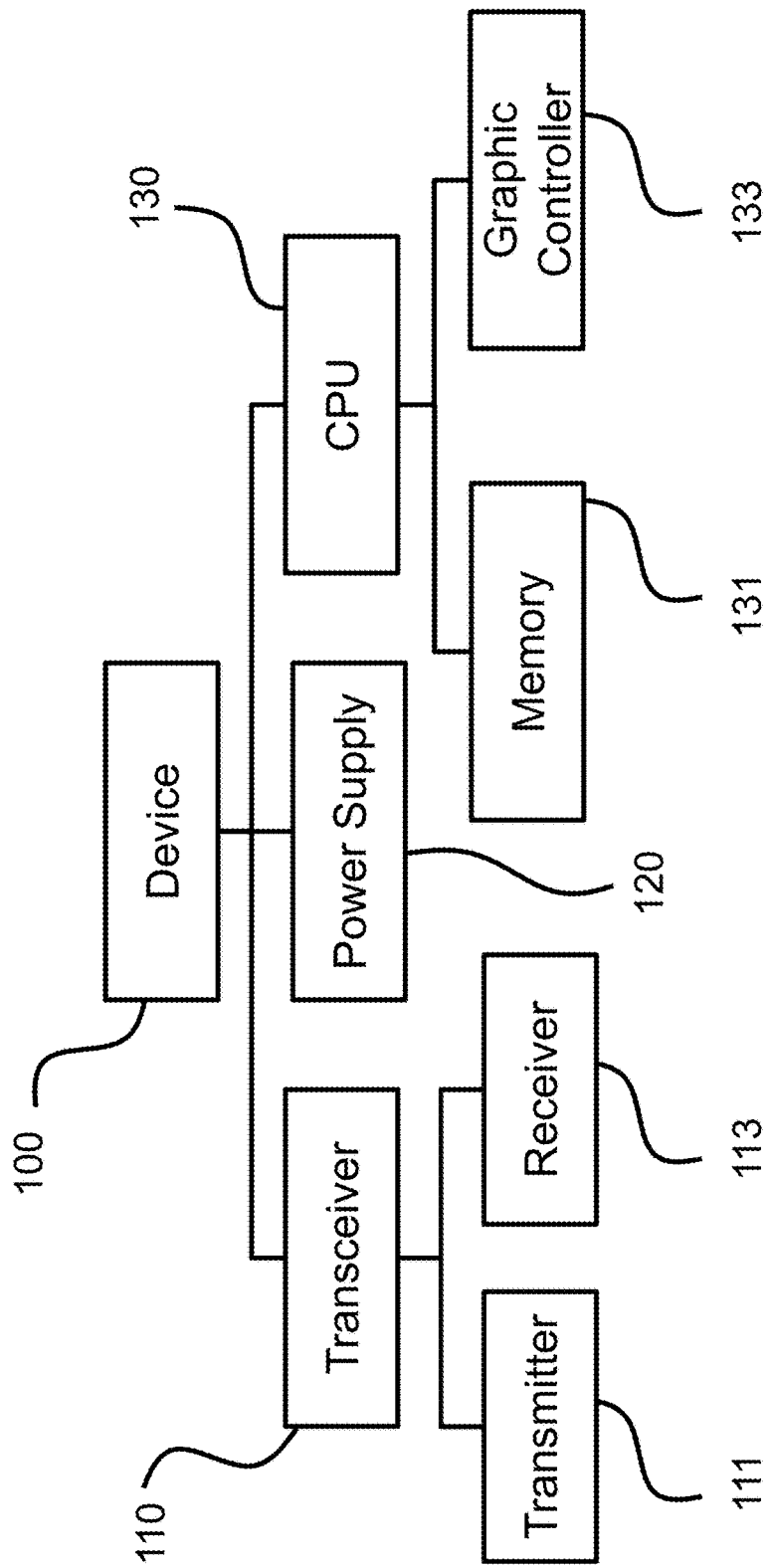
FIG. 1A is a tree diagram defining an example hierarchical division and organization of an example system into individual elements.

Reference will now be made in detail to exemplary embodiments, which are illustrated in the accompanying drawings, wherein like reference numerals refer to the like elements throughout. The embodiments are described below in order to explain the disclosed system and method by referring to the figures.

Section headings are included in this Detailed Description. It is noted that these section headings are for convenience only and should not be interpreted as limiting the scope of the claimed invention in any way.

Generally, an electronic system or device may be designed by way of a schematic. In an electronic design context, a schematic is typically supported by one or more data files defining the design of the desired system, which may be generated, amended, and interpreted by electronic design software tools. Information defined in the schematic may include components, interconnections therebetween, and parameters of both such as part numbers, specific locations, size, and configuration.

A variant of the design may be created to adapt the design, and its schematic, to a difference in design requirements. The variant may be represented in one or more data files, and may be thought of as an overlay for the original "root" design. A variant overlay redefines parameter values for selected parameters in the schematic, which have different values in the root schematic. For example, a capacitor may be specified to provide a particular capacitance value(s) in the root design, but due to some difference in requirements, such as expectation of a different supplied voltage, the variant requires a capacitor of a different capacitance value(s) in the same place in the design. The variant overlay therefore designates the new capacitance, and when applied to the root schematic will replace or override the original capacitance in the schematic to generate a variant schematic. Several such variant overlays may exist as there may be several sets of differing design requirements.

As detailed in the embodiments described herein, a design and its schematic may be hierarchically divided into smaller, low-level elements, or "blocks," which may be separately and concurrently designed in detail. A block variant overlay may also be generated for these blocks. As the low-level blocks are integrated to form higher-level elements, overlays existing for the same set of design requirements are similarly merged into higher-level variant overlays, until both a complete schematic and a variant overlay for said complete schematic are generated.

At all specified levels, a variant and its overlays maintain association with the design requirements which make it necessary. The set of design requirements may therefore have a label to simplify this association, which throughout this description will be referred to as the label both of a given set of requirements and of the associated variant and overlays. The label should be unique to the specific set of design requirements.

1. Hierarchical Design and Schematic Blocks

FIG. 1A depicts a hierarchical tree organizing a design for an example system 100. The example system is merely provided for illustrative purposes, and the invention, and disclosed embodiments thereof, may be applied to the design process of numerous systems of all kinds.

The system 100, which defines Level 0 of the hierarchy, includes a transceiver 110, a power supply 120, and a CPU 130, which define Level 1 of the hierarchy. The transceiver 110 is further divided into a transmitter 111 and a receiver 113, and the CPU is further divided into a memory 131 and a graphic controller 133; these four elements define Level 2 of the hierarchy.

When generating a schematic for a system, the lowest-level elements of each branch in the hierarchy—in this example, transmitter 111, receiver 113, power supply 120, memory 131, and graphic controller 133—may each be designed by a separate design team, resulting in a smaller schematic or "schematic block." For convenience, the system element and its schematic block will be referred to interchangeably hereinafter.

Each schematic block is modular relative to its "parent" block, and may therefore be integrated into the next level up in the hierarchy. In this example, the transmitter 111 and receiver 113 are integrated into the transceiver 110, and the memory 131 and graphic controller 133 are integrated into the CPU 130, and then the transceiver 110 and CPU 130 are integrated with the power supply 120 into the entire system 100. At each level of integration, further design may occur, for instance for interconnections between the elements of the lower-level block; therefore, the mid-level elements such as the transceiver 110 and CPU 130, and the top-level element of the system 100 itself, are also considered to have schematic blocks.

For convenience, the example system of FIG. 1A, and its hierarchy and schematic blocks, will be referred to repeatedly throughout this description, although it is again understood that the invention and its embodiments are generally applicable to the electronic design of all manner of systems. Additionally, for brevity, the description will focus on the transceiver 110 branch of the hierarchy hereinafter, although it is understood that the methods and systems described would also be applied to the other branches in the same manner, in numerous embodiments.

Preferably, the distinction between a "schematic" and a "schematic block" is purely relative to its place in the hierarchy and the system intended to be constructed. Therefore, a schematic may also be a schematic block for an even larger hierarchy, while a schematic block may be treated as if it were a full schematic of its own, and its components replaced with lower-level schematic blocks. Additionally, a schematic block may be thought of as defining, in detail, a component of a higher-level schematic block.

In this description, the "schematic" or "schematic model" refers to the schematic block which is the end-goal of a design process; that is, the "top-level" or "system-level" schematic block which has no higher-level "parent" block, according to the hierarchy. In the example of FIG. 1A, the system level is Level 0, and the system 100 is the system-level schematic.

Also in this description, a "bottom-level" schematic block is a block in the lowest level of the hierarchy, where no schematic block has a "child." In the example of FIG. 1A, the bottom level is Level 2, and transmitter 111, receiver 113, memory 131, and graphic controller 133 are bottom-level schematic blocks.

There may be one or more intermediate levels of schematic blocks in the hierarchy, where at least one schematic block has both a "parent" block and a "child" block. In the example of FIG. 1A, Level 1 is an intermediate level, and transceiver 110, power supply 120, and CPU 130 are intermediate-level schematic blocks. It is noted that this is the case even though power supply 120 has no child blocks.

A "base-level" schematic block is any schematic block that has no child. Every bottom-level schematic block will be a base-level schematic block, but an intermediate-level schematic block, such as power supply 120, may also be a base-level schematic block.

Numerous data file implementations of a schematic, and the blocks thereof, can be imagined by those of skill in the art, and are within the scope of the invention. Preferably, a schematic block should define at least one component and at least one interconnection. (For brevity, interconnections will be treated as another kind of component hereinafter, unless the distinction is necessary for clarity.) The definitions of these components preferably include parameters with values; these parameters may include one or more designations for the component (such as a part number, manufacturer, or part type), physical size and location, links to connecting elements, and various applicable qualities and configurations (such as capacity for a memory chip, frequency for a clock unit, capacitance for a capacitor, or resistance for an interconnection). The block itself may also have parameters unrelated to any specific component.

In an example data format implementation, an example component, specifically a memory chip, might be defined as follows:
PART_NUMBER: CDN-MEM-0032
PACK_TYPE: FBGA96
JEDEC_TYPE: FBGA96
HEIGHT: 1.05 mm
ROHS: Compliant
STATUS: [null]
MANUFACTURER: CDN
MPN: CDN_M1J28HA
DESCRIPTION: DDR3 SDRAM 16MEG×16×8 Banks
SPEED_GRADE: TCK=1.25 ns, CL=10
Similarly, another example component, specifically a capacitor, might be defined as follows:
MATL: CE
VALUE: 0.33UF
VOLT: 50V
TOL: 20%
PACK_TYPE: SM
OTHER: 1210
PART_NUMBER: 11-0712-01
JEDEC_TYPE: C1210-S0
VALUE: 0.33UF
TOL: 20%

Those of skill in the art will be able to implement other data formats defining information about components without departing from the scope of the invention.

Preferably, whenever a schematic block is amended, its parent is also automatically amended to reflect the same changes, and so forth up the hierarchy to the system-level schematic. This automatic amendment may be done immediately, or as part of a check whenever a higher-level block is accessed.

The hierarchical approach described in this section allows multiple teams to design different aspects of the overall system which is the end-goal of the design project. The modular, collaborative approach to design has multiple advantages. The blocks may be designed in parallel, accelerating the design process. With careful division of the hierarchy, each block may be designed with minimal or no concern for the details of the designs of the other blocks. Also, blocks may also be reused for other components with identical function, either in the same system or in other systems to be designed later.

2. Variants and Variant Overlays

For various reasons, a design project may have multiple sets of similar, but not identical, design requirements, in most cases because the electronic system represented by the schematic will be used in the same way for the same function, but in slightly different contexts. These different contexts are frequently though not necessarily related to the intended market (i.e. the country in which the system will be sold) and may include a different expected supply voltage, different regulatory requirements, and/or different operating standards. The context might also be a larger apparatus in which the system is intended for installation, such as an engine controller installed in one of several types of engines. The context might also be different operating conditions, such as expectations of different external temperatures.

Rather than design an entire new system schematic for each set of design requirements, a variant may be used. A variant is preferably based on an original, "root" schematic as a starting point and makes adjustments to some of the parameter values there within, to the extent necessary to generate a variant schematic that meets the design requirements of the new context.

A variant may be implemented as an overlay. A variant overlay redefines the values of certain parameters in the schematic or its components, preferably using the same data format as in the schematic blocks. Parameter values that do not require change, according the needs of the different design requirements, are preferably not defined in the overlay; this lack of definition may extend to entire components or even blocks which need not be altered at all. The overlay is thereby of a smaller file size than an equivalent schematic, and requires less work to design.

The variant overlay may also define an additional parameter of whether a component, or a block itself, is present. For example, this parameter may have a "Do Not Install" value when the different design requirements call for removal of a component that is in the root schematic. Likewise, this parameter may have an "Install" value when the different design requirements call for addition of a component that is not in the root schematic.

In the root schematic, or in the variant overlay, components may be grouped to provide an understanding that they must be either installed or not installed as a group. Therefore, a component presence parameter and any value thereof are applied to the entire grouping. This grouping may also be called a "function" for the group of components.

When the variant overlay is applied to the root schematic, the parameter values defined in the overlay are assigned to the parameters in the schematic, replacing or overriding the original values and generating a new schematic. The new schematic is reflective of the variant overlay and therefore meets the design requirements for the variant. As one example, if the root schematic defines the capacitance value of a particular capacitor as 0.33 µF, but the variant overlay defines the capacitance value of the same capacitor as 0.22 µF, then applying the variant overlay to the root schematic will generate a new variant schematic where the capacitor has a capacitance of 0.22 µF. Another example variant overlay may define a value for the presence parameter of the same capacitor as Do Not Install, and if this variant overlay is applied to the root schematic, the resulting variant schematic will not have this capacitor at all.

Given that variant overlays will be applied to the root schematic to generate variant schematics, some embodiments may allow the root schematic to be deliberately designed to be generic, allowing for broadly defined design requirements to cover the range of all specific sets of design requirements. Some embodiments may additionally allow parameter values to be left completely undefined in the root schematic, with expectation that the variant overlays will provide values for these parameters. However, these embodiments preferably require that all variant overlays supply variant values for at least the undefined values, to avoid errors during generation of the variant schematics. Other embodiments may require that all parameters have values even in the root schematic.

In some cases, one of several parameter values may be appropriate for the root schematic. This is especially common in the case of component designation parameters, where any of multiple components of equivalent or similar function may, without more specific design requirements, serve the needs of a generic schematic. The root schematic may in such cases use an alternate group which defines all of said components, and the variant may select the most appropriate of the group for the needs of the design requirements.

In this manner, using one root schematic and a set of variant overlays, numerous variant schematics may be generated as needed. The variant overlays may also be developed concurrently by separate teams, increasing design efficiency, especially in cases where specific teams might be more conscious of the needs of particular design requirements.

In some embodiments, the generated variant schematics are not maintained in memory, but are re-generated as needed from the root schematic and appropriate variant overlay. In other embodiments, the generated variant schematics are maintained in memory so as to be readable by design tools which are not capable of interpreting variant overlays. Preferably, both options are presented.

For convenience, the descriptions that follow will assume the different sets of design requirements, and correspondingly the different variants and overlays, are associated with different intended markets—specifically, in this example, China, Europe, and India. Both the design requirement sets and the variants will therefore be identified and labeled by said markets. It is understood, however, that the invention and its embodiments are equally applicable to variants which are adapted for other types of contexts, such as those described above, among others.

FIG. 1B illustrates the transceiver branch of the system hierarchy of FIG. 1A, with the application of variants to the system-level schematic. In this approach, system variant overlays for the different markets are developed for the system-level block, namely the system 100, after the individual base-level blocks have been integrated up through the hierarchy to form said system-level block. The system variant overlays are contained in a system-level variant database 100a for application as needed to generate variant schematics. These variants must be redeveloped if any lower-level block is altered, requiring coordination between design teams, and are unhelpful if a lower-level block is reused in another design.

However, according to an embodiment of the invention, variant overlays are not limited to the entire schematic. Rather, a block variant overlay may be designed for and associated with a base-level schematic block of the root schematic. The block variant overlay may then be applied to the block itself, or to the appropriate elements of the complete root schematic after the blocks are integrated.

Figure 1C:
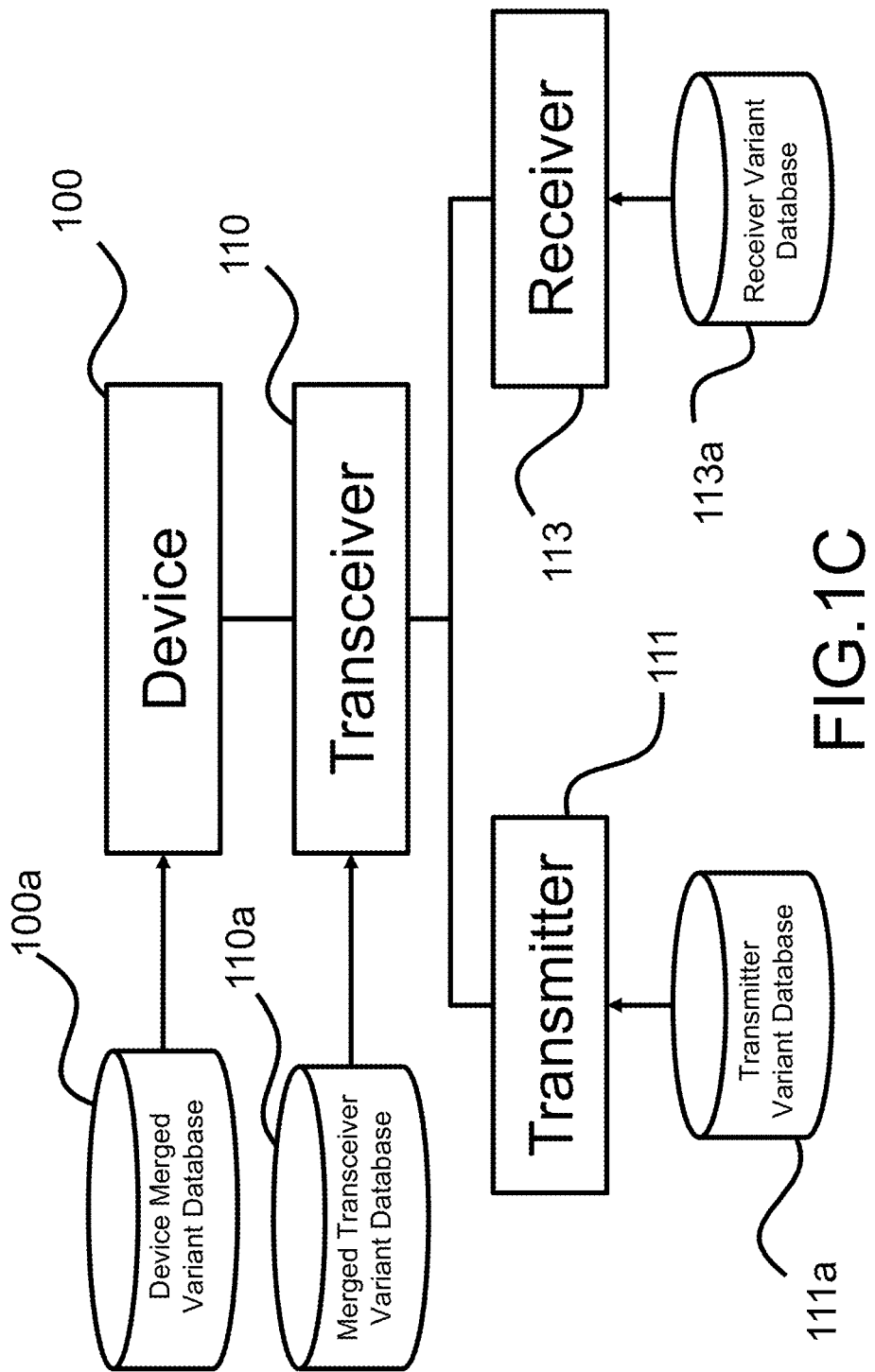
FIG. 1C is a transceiver branch of the tree diagram of FIG. 1A, further depicting the application of one or more variant overlays from combined databases to all elements of the branch, according to an embodiment of the invention.

FIG. 1C illustrates the transceiver branch of the system hierarchy of FIG. 1A, with the application of variants to the schematic blocks according to an embodiment of the invention.

In FIG. 1C, the transmitter 111 and receiver 113, which are base-level schematic blocks, are provided with block variant databases 111a and 113a, respectively. Each database contains the block variant overlays associated with their respective blocks, which are added to the databases as they are generated by a variant designer. The block variant overlays define parameter values specifically for parameters of the respective blocks, according to the variant sets of design requirements.

Each block variant database preferably contains one block variant overlay for each variant set of design requirements. However, in practice, it may be the case that a particular base-level schematic block requires no changes from the root schematic for a particular variant set. Depending on the embodiment, the database may in this case contain a "null" overlay associated with said variant set; alternatively, a directory for the database may note that no overlay for the variant set exists. The same approach may also be used when a variant has yet to be properly defined.

The transceiver 110 is provided with an intermediate variant database 110a, which is preferably implemented in the same manner as the block variant databases 111a and 113a.

Because transceiver 110 is a "parent" of transmitter 111 and receiver 113, to fill the intermediate variant database 110a for transceiver 110, the block variant overlays from the block variant databases 111a and 113a are merged according to their associated variant sets. That is, for each variant set of design requirements, the associated block variant overlay from each of the block variant databases 111a and 113a is selected and merged to generate an intermediate variant overlay. This intermediate variant overlay is associated with the same variant set, and includes all data from both individual block variant overlays, including all variant parameter values. The intermediate variant overlay is then stored to the transceiver intermediate variant database 110a.

If the transceiver 110 has additional parameters which are in neither the transmitter 111 nor the receiver 113, a variant designer may add values for said parameters to one or more of the intermediate variant overlays for the transceiver 110. Preferably, this has no effect on the parameter values of the intermediate variant overlay originating from either of the block variant overlays.

The same approach is employed to merge the intermediate variant overlays in the transceiver intermediate variant database 110a with other intermediate variant overlays for databases at the same intermediate level, such as for the power supply and CPU (not depicted in FIG. 1C), to generate system variant overlays for the system-level variant database 100a of the system 100.

It will be apparent to those of skill in the art that such methodology may be employed for a schematic hierarchy with any number of levels, each containing any number of schematic blocks.

When a variant overlay is altered for any level, preferably the higher-level variant overlays generated therefrom are automatically updated. That is, when a parameter value in a block variant overlay is changed and the updated overlay stored to the appropriate block variant database, the change is propagated to the same parameter of the corresponding intermediate variant overlay in the intermediate block variant database, and so forth up the hierarchy. In this manner, the system variant overlays are automatically updated responsive to changes to the block variant overlays. This automatic update may be done immediately, or as part of a check whenever a higher-level overlay is accessed.

The databases themselves may be shared or copied, which allows for reuse in other projects. For example, a separate design project may also include a receiver with one or more of the same variant sets of design requirements. Once properly designed, the (root) schematic block for the receiver 113, and the receiver block variant database 113a, may be copied to this new project, providing pre-designed variants of a transmitter in a useful form separate from the rest of the system 100. As another example, a project might need multiple identical memories, such as memory 131 of FIG. 1A. The project may design one memory thoroughly, and then reuse its block and variants in the appropriate places in the hierarchy. Under this system and methodology, a library of schematic blocks and associated variant overlays may be maintained for use in any project, immediately available for said projects.

As an additional advantage, the block variants may be designed by the same design teams as the blocks themselves, these teams having a better understanding of the respective blocks, their components, and their parameters than a team managing the schematic integration at the system level. Testing of a variant design may also be performed at the block level, even while the variant overlays for the other blocks are unavailable. Additionally, the design team may alter the variant immediately after making an alteration to the schematic block, rather than informing a system-level integration team of the change and instructing them to alter the system variant overlay manually.

As yet another advantage, development is less dependent on having all pieces of the root schematic. For instance, for the system 100 of FIG. 1A, if the design of the graphic controller 133 or its variant overlays is delayed, design of the transceiver 110, power supply 120, and memory 131, each with variant overlays, is unaffected.

As shown in FIG. 1C, all variant overlays associated with a schematic block are stored in one combined database. However, this approach is not required.

Figure 1D:
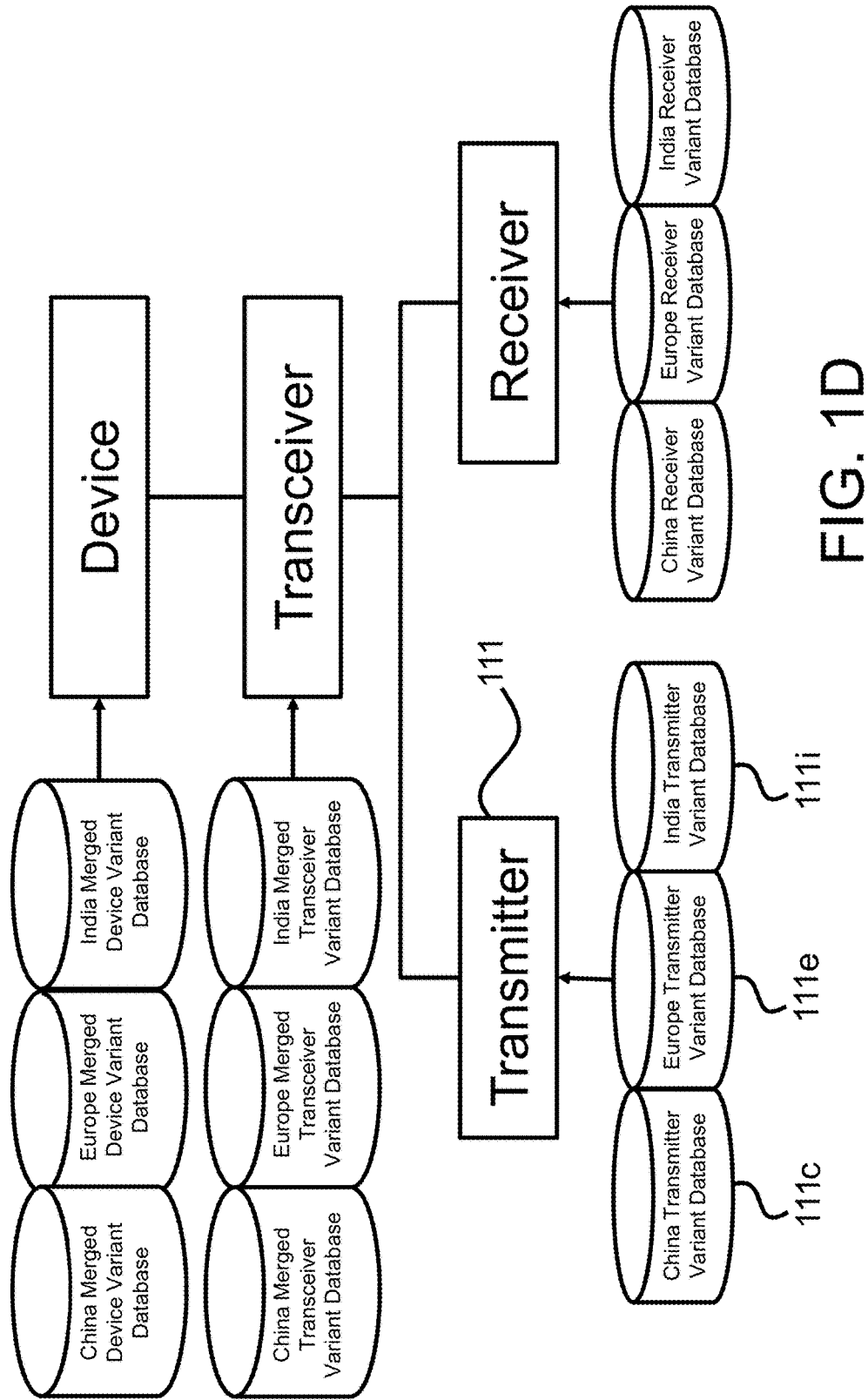
FIG. 1D is a transceiver branch of the tree diagram of FIG. 1A, further depicting the application of one or more variant overlays from distributed databases to all elements of the branch, according to an embodiment of the invention.

FIG. 1D illustrates the transceiver branch of the system hierarchy of FIG. 1A, with the application of variants to the schematic blocks according to another embodiment of the invention. This embodiment is similar to that of FIG. 1C, but in place of a single variant database assigned to each schematic block, such as to transmitter 111, three distributed variant databases 111c, 111e, and 111i are provided. Each distributed variant database is assigned not only to a schematic block, but also to a specific variant set of design requirements, and contains only variant overlays associated with both. That is, in the provided example, distributed variant database 111c contains only variant overlays associated with the transmitter 111 and a Chinese variant set of design requirements, distributed variant database 111e contains only variant overlays associated with the transmitter 111 and a European variant set of design requirements, and distributed variant database 111i contains only variant overlays associated with the transmitter 111 and an Indian variant set of design requirements.

In this manner, the variant overlays may be managed separately at every level, which may be preferable in some circumstances. For the example variants provided, an integration team might be assigned to each region or market, and therefore only interested in the variant overlays applicable to that region. Using a distributed approach, the database specifically having the Chinese variant overlays may be shared with the Chinese integration team, without also needing to send the variant overlays of the other markets, and likewise for the European and Indian integration teams. Said distributed databases may be stored locally with the corresponding teams.

However, combined databases such as depicted in FIG. 1C are simpler to implement, and may be preferable when there is only one integration team.

It is also noted that the variants may be semi-combined and semi-distributed. For example, multiple variant sets of design requirements may be applicable within Europe, and may might be combined into a Europe variant database, but kept separate from other variants applicable within India, which would be combined into an India variant database instead.

3. Illustrative Implementations

Figure 2A:
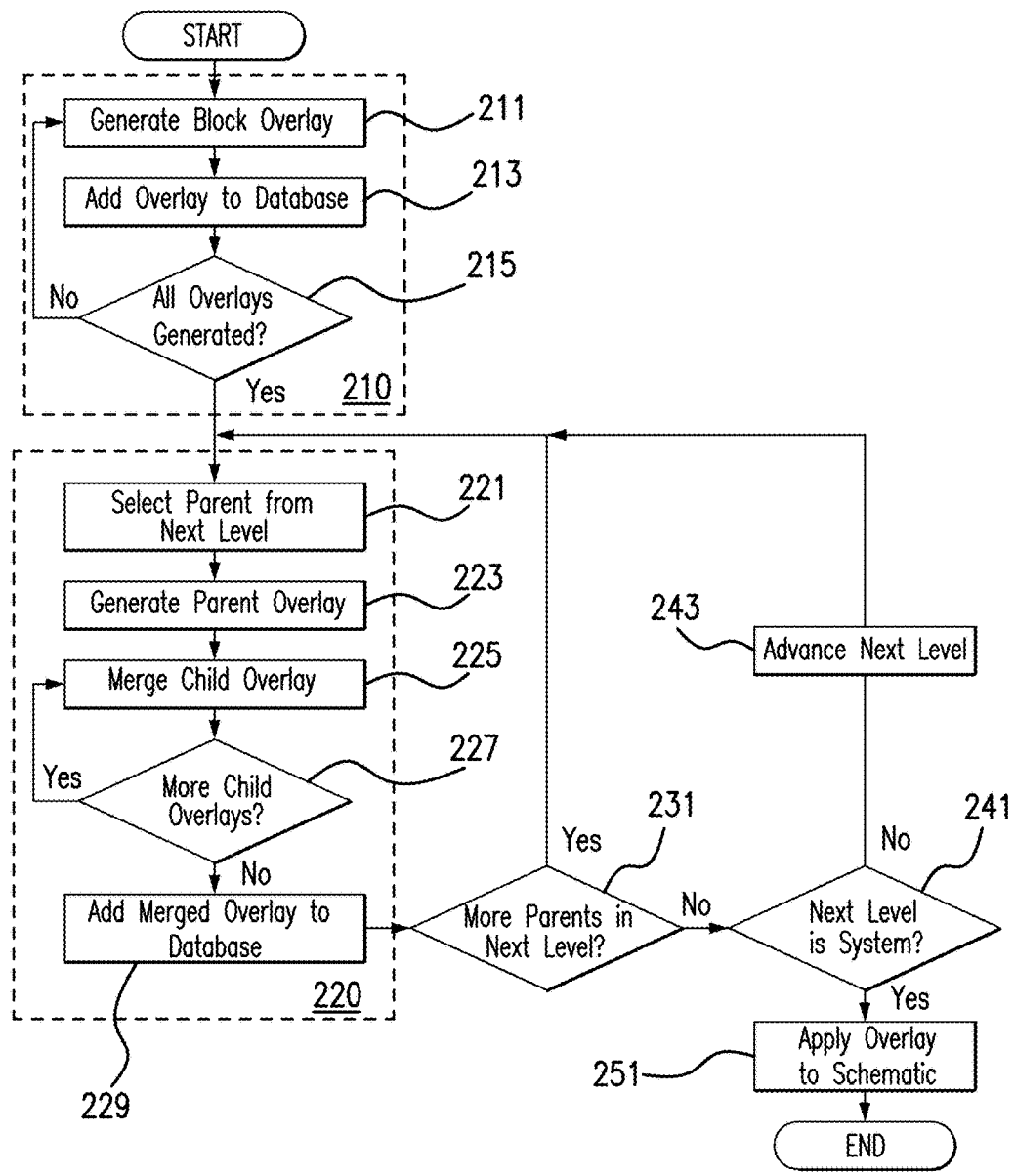
FIG. 2A is a block flowchart illustrating a method of generating and applying a system variant overlay, according to an embodiment of the invention.

FIG. 2A is a flowchart depicting a method of generating and applying a system variant overlay, according to an embodiment of the invention. FIG. 2A assumes a single variant set of design requirements, but may be repeated for additional sets.

At 210, the block variant overlays for the base-level schematic blocks of a hierarchically divided system-level schematic are generated, according to the variant set of design requirements.

Specifically, at 211, a block variant overlay is generated for one of the base-level schematic blocks. As this is a base-level schematic block, in some embodiments the block variant overlay may be designed by a human designer, making this operation largely manual, but the operation may be partially or completely automated in other embodiments. For the purposes of the embodiment of FIG. 2A, the overlay may be empty of data or "null" if no overlay for the block is necessary for the selected variant set of design requirements.

At 213, the block variant overlay is added to the block variant database assigned to the associated base-level schematic block.

At 215, it is checked whether all block variant overlays have been generated for the variant set of design requirements. If not, the loop returns to operation 211 to await the generation of more overlays. If, however, all necessary block variant overlays are generated, the process advances.

At 220, the overlay for the next level in a branch in the schematic hierarchy is generated by merging the overlays of the present level in said branch. The next level may be the system level or an intermediate level, and therefore the variant overlay generated by 220 may be the system variant overlay or an intermediate variant overlay.

Specifically, at 221, a next level schematic block is selected as a parent block, and its present level children determined according to the hierarchy. At 223, a parent variant overlay is generated with no data. At 225, a child variant overlay associated with a present level child of the parent block is merged into the parent variant overlay, by adding all variant parameter values of the merging child variant overlay into the parent variant overlay.

At 227, it is checked whether there are additional variant overlays for the present level children determined at 221. If so, the loop returns to operation 225 to merge another child variant overlay into the parent variant overlay. If not, then at 229, the parent variant overlay is added to the variant database assigned to the parent schematic block.

It is noted that the operation loops of 210 and 220 may operate semi-concurrently by redefining "all block variant overlays" in operation 215 as "all block variant overlays in a branch." Once all block variant overlays in a branch are completed, operation loop 210 continues but operation loop 220 may begin immediately merging the block variant overlays of the completed branch.

At 231, it is checked whether there are more schematic blocks on the next level which have not been selected as a parent block. If there are, the flow returns to operation 221 to select a new parent, and operation loop 220 repeats for the newly selected parent and branch. If not, all variant overlays for the next level have been generated, and the process may advance to 241.

At 241, it is checked whether the next level is the system level. If not, at 243, the next level is made the present level. The flow then returns to operation 221 to select a new parent on the new next level, and operation loop 220 repeats for the newly selected parent and branch.

If, at 241, the next level is the system level, then the most recently generated variant overlay is the system variant overlay for the variant set of design requirements, and has been added to the system-level variant database. The process may exit immediately, or, optionally, at 251, the system variant overlay may be applied to the root system-level schematic. Specifically, the parameter values of the system variant overlay are assigned to the corresponding parameters in the root system-level schematic, replacing any existing values. The resulting schematic is the variant system-level schematic for the variant set of design requirements.

Figure 2B:
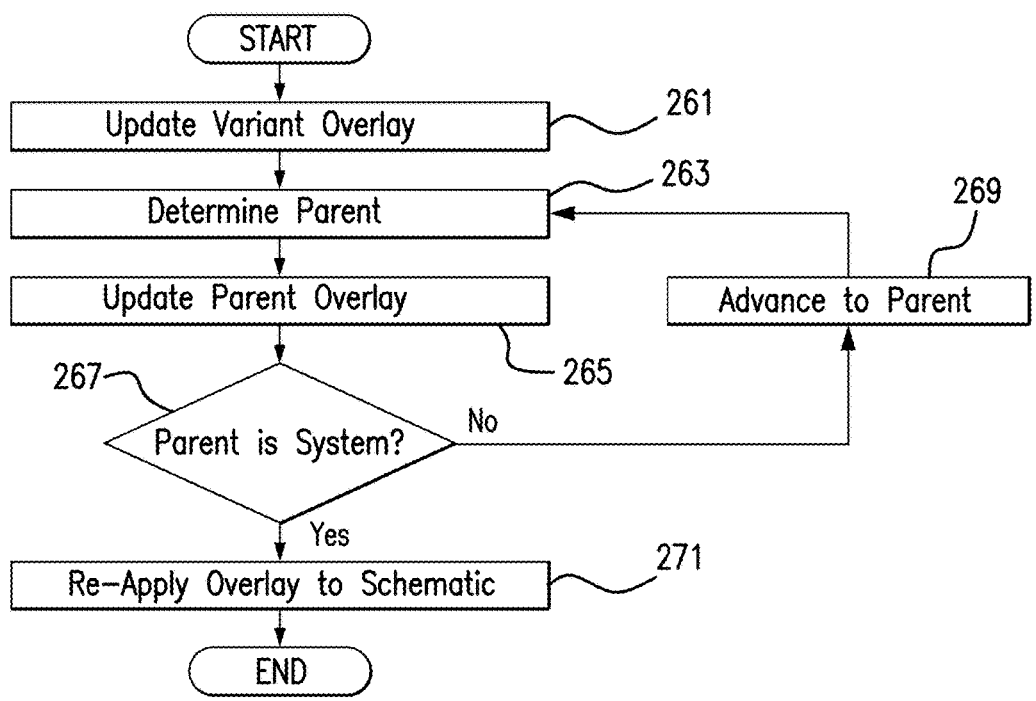
FIG. 2B is a block flowchart illustrating a method of updating a system variant overlay in response to an update to a lower-level overlay, according to an embodiment of the invention.

FIG. 2B is a flowchart depicting a method of updating a system variant overlay in response to an update to a lower-level overlay, according to an embodiment of the invention.

At 261, one or more parameter values of a variant overlay are updated, the variant overlay being associated with a variant set of design requirements. In most circumstances, this will be a block variant overlay of a base-level schematic block, but in some circumstances, the process may begin with a higher-level overlay.

At 263, the parent block of the schematic block of the presently updated variant overlay is determined. At 265, the variant overlay for said parent block which is associated with the variant set of design requirements is updated to match the updated parameter values.

At 267, it is determined whether the parent block is the system-level schematic itself. If not, at 269, the variant overlay for said parent block is made the presently updated variant overlay, and the flow returns to 263 to determine the next parent.

If at 267, the parent block is determined to be the system-level schematic, then the system-level variant overlay for the variant set of design requirements has been successfully updated to reflect the changes at the lower level. The process may exit immediately, or, optionally, at 271, the system variant overlay may be applied to the root system-level schematic. Specifically, the parameter values of the system variant overlay are assigned to the corresponding parameters in the root system-level schematic, replacing any existing values. The resulting schematic is the newly updated variant system-level schematic for the variant set of design requirements.

Figure 3:
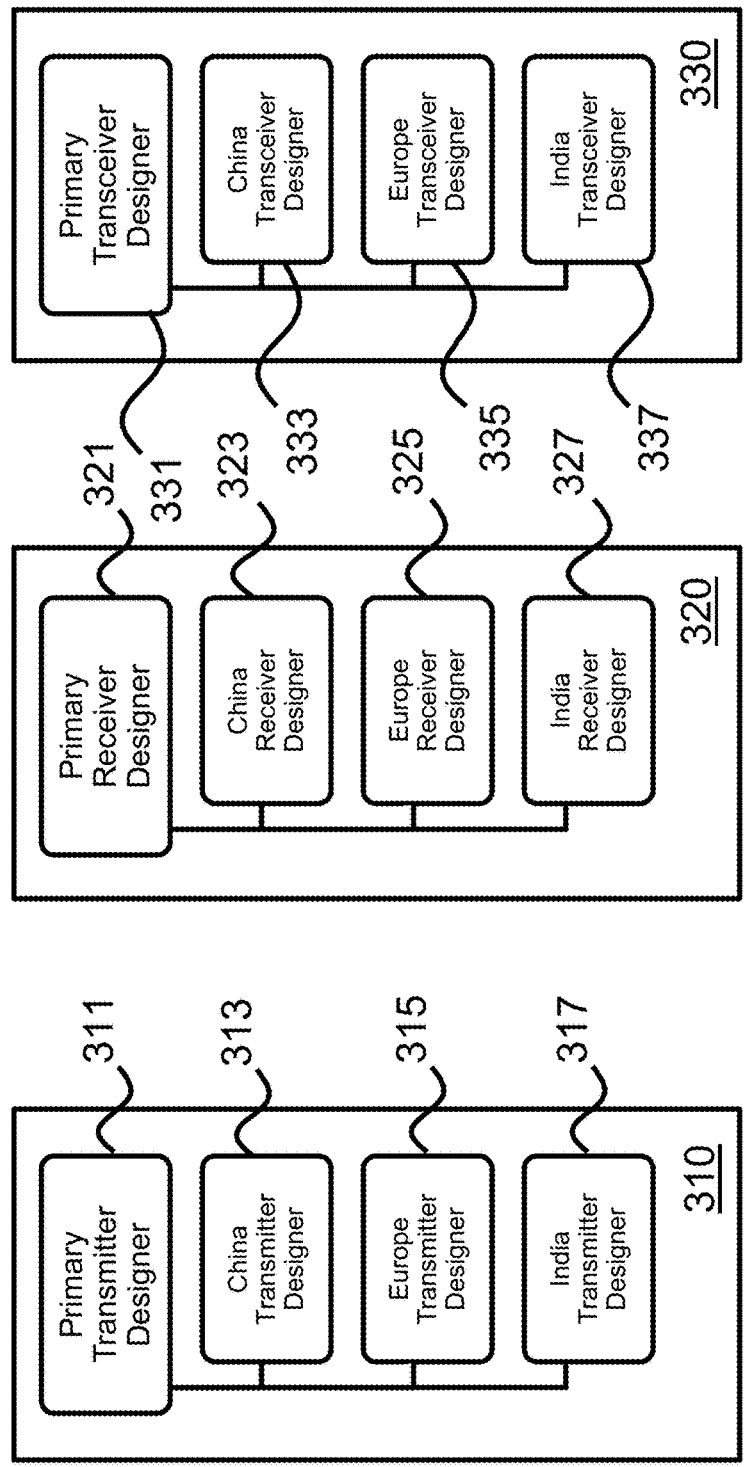
FIG. 3 is an organization chart of an example design team which may employ embodiments of the invention in practice.

FIG. 3 depicts organization of an example design team for the example system 100 of FIG. 1A-1D. Designers 311, 313, 315, and 317 are organized into the transmitter design team 310 for transmitter 111. Designers 321, 323, 325, and 327 are organized into the receiver design team 320 for receiver 113. Designers 331, 333, 335, and 337 are organized into the transceiver integration team 330 for transceiver 110. For reasons of brevity, other teams and designers for the other schematic blocks will be omitted.

The primary transmitter designer 311 designs the schematic block for the transmitter 111. Once the block is complete, the Chinese transmitter designer 313 designs Chinese variants for the transmitter 111 by generating the variant overlays according to one or more Chinese variant sets of design requirements. Likewise, European and Indian transmitter designers 315, 317, design the European and Indian variants.

Similarly, the primary receiver designer 321 designs the schematic block for the receiver 113, allowing the Chinese, European, and Indian receiver designers 323, 325, 327 to design the respective variants therefor.

Once the base-level schematic blocks for the transmitter 111 and receiver 113 are finished, the primary transceiver integrator 331 may integrate them to generate the intermediate schematic block for the transceiver 110, which contains all components of both base-level schematic blocks. This integration may be done before completion of any of the respective variant overlays. Integration is a largely automatic process but may require the primary transceiver integrator 331 to design the interconnections between the transmitter 111 and receiver 113, and to confirm that the two blocks operate together as intended.

The Chinese, European, and Indian transceiver integrators 333, 335, 337 likewise merge the block variant overlays from their corresponding variant designers to generate intermediate variant overlays. This too is largely automatic, but once the primary transceiver integrator 331 has completed the manual parts of the integration, the integrators 333, 335, 337 may add parameter values for any additions to the transceiver.

In certain cases, an integrator may also choose to override the presumption that the same design requirements should be applied to all blocks at all levels, and may select a variant overlay for one component corresponding to one set of design requirements but a variant overlay for another component corresponding to a different set of design requirements. For example, multiple voltage designs allow different voltages to be applied to different components of the larger system, and therefore the corresponding design requirements for these components may differ. If, for example, one of the European designs applies a voltage V1 to the transmitter but a different voltage V2 to the receiver, the European transmitter designer 315 will design a transmitter variant overlay for voltage V1's requirements, the European receiver designer 325 will design a receiver variant overlay for voltage V2's requirements, and the European transceiver integrator 335 will merge the two into a specialized V1/V2 transceiver variant overlay, which may be selected by even higher-level integrators.

The transmitter designer 315 need not be aware that the receiver designer 325 is designing for another voltage, and likewise for the receiver designer 325 with respect to the transmitter designer 315. Additionally, both designers may design for both (and other) voltages, allowing the European transceiver integrator 335 to generate transceiver variant overlays having any number of combinations of voltages.

With the overlays merged, assume that the transmitter designer 311 has now found a problem in the transmitter schematic block 111, and makes a change which affects two parameters. He then alerts the rest of his team. The Indian transmitter designer 317 checks those two parameters and updates the corresponding values in the Indian variant overlay for the transmitter schematic block 111. The Chinese and European transmitter designers 313 and 315 likewise check the two parameters but find that their respective variant overlays do not address those parameters and do not need to.

The change to the transmitter schematic block 111 is automatically integrated into the transceiver schematic block 110. The primary transceiver integrator 331 may responsively confirm that the transceiver schematic block 110 as a whole still operates as intended, but otherwise need do nothing.

Likewise, the changes to the parameter values in the Indian transmitter variant overlay automatically replace the old parameter values in the corresponding Indian transceiver variant overlay, and need only be given a brief examination by the Indian transceiver integrators 337 to confirm the variant at that level is still viable. If the altered Indian transmitter variant overlay is used in more than one transceiver variant overlay, all such transceiver variant overlays are automatically changed in response to the change to the Indian transmitter variant overlay.

The Chinese and European transceiver variant overlays all remain unchanged. In a distributed embodiment, such as in FIG. 1D, the databases containing the Chinese and European transceiver variant overlays are not even accessed.

These and related algorithms, and other necessary instructions, may be encoded as executable instructions on one or more non-transitory computer readable media, such as hard disc drives or optical discs, and executed using one or more computer processors, in concert with an operating system or other suitable measures.

Figure 4A:
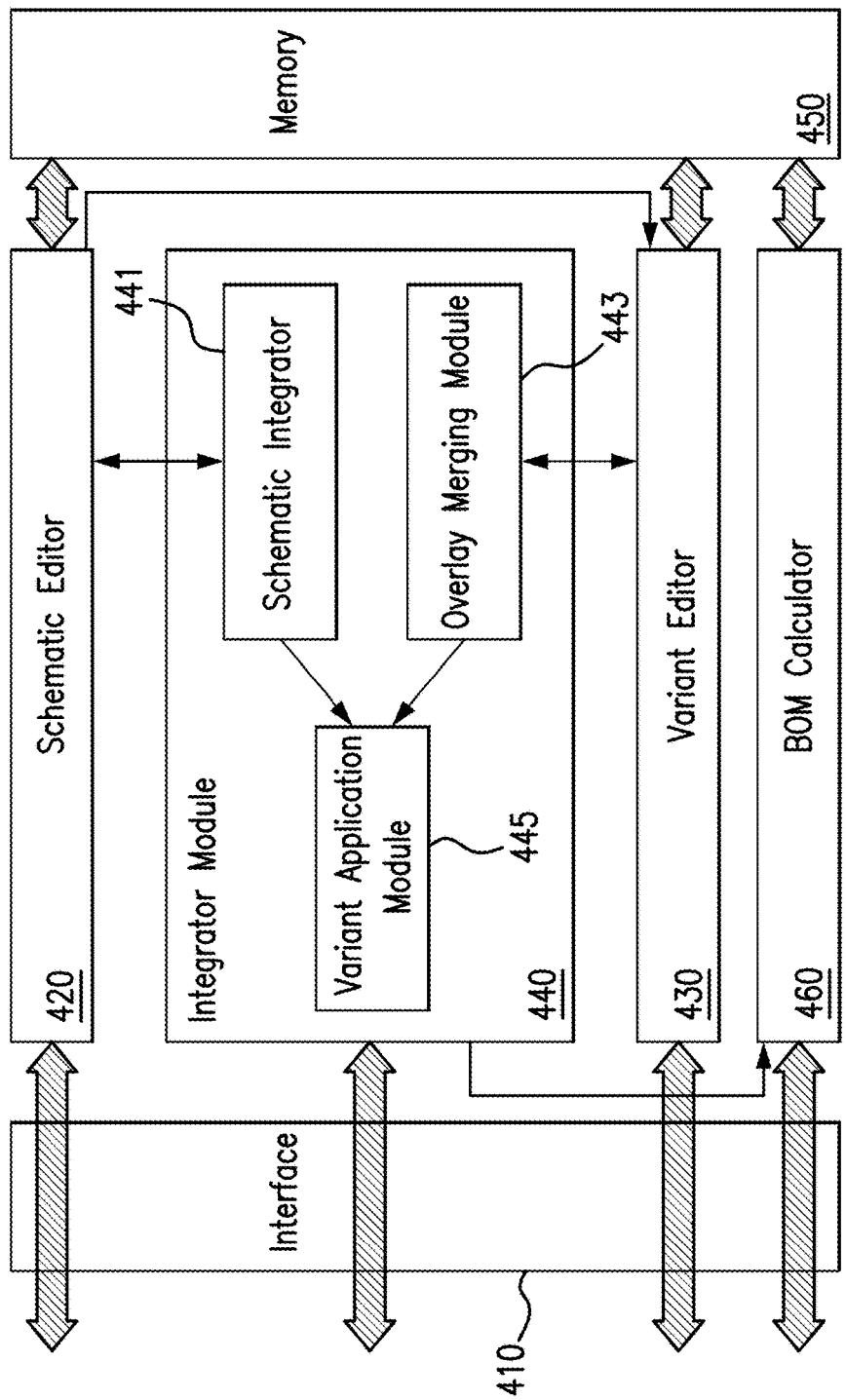
FIG. 4A is a block diagram illustrating a system for generating, applying, and updating a system variant overlay, according to an embodiment of the invention.

FIG. 4A depicts an illustrative system implementing the subject method, according to an exemplary embodiment of the invention.

A schematic designer may use the user interface 410 to interface with a schematic editor 420, using the editor 420 to design, generate, and edit the base-level schematic blocks.

The schematic editor 420 provides the base-level schematic blocks to an integrator module 440, and more specifically a schematic integrator module 441. The schematic integrator 441 integrates low-level schematic blocks to generate higher-level schematic blocks, such as base-level to intermediate-level, intermediate-level to system-level, or base-level to system-level. The integrated schematic blocks may be returned to the schematic editor 420 for further editing.

The schematic editor 420 also provides the base-level schematic blocks to a variant editor 430. A variant designer may use the user interface 410 to interface with the variant editor 430, using the editor 430 to design, generate, and edit the block-level variant overlays according to the provided base-level schematic blocks, by defining variant parameter values for parameters of said base-level schematic blocks.

The variant editor 430 provides the block-level variant overlays to the integrator module 440, and more specifically an overlay merging module 443. The overlay merging module 443 merges low-level variant overlays to generate higher-level variant overlays, such as block overlays to intermediate overlays, intermediate overlays to system overlays, or block overlays to system overlays. The overlay merging module 443 may do so automatically for variant overlays sharing a set of design requirements, and may furthermore merge variant overlays having different sets of design requirements, responsive to instructions by a user. The merged variant overlays may be returned to the variant editor 430 for further editing.

The integrator module 440 also contains a variant application module 445 which assigns the parameter values of a variant overlay to the corresponding parameters of a corresponding root schematic block, thus generating a variant schematic block. The variant schematic block may then be presented to a designer through the user interface 410.

The schematic editor 420 also provides its blocks of all levels to at least one memory 450 for storage. The blocks may be organized in a database or databases by level or by other convenient organization.

The variant editor 430 also provides its overlays of all levels to the at least one memory 450 for storage. Preferably, the overlays are stored to databases assigned to the respective schematic blocks, such as shown in FIG. 1C or 1D.

In some embodiments, the system may also compute estimated costs for the materials of a schematic, using a bill of material (BOM) calculator 460. As an example, a schematic block may require two Type A chips and one Type B chip. The cost of purchasing each type of chip may be stored in the at least one memory 450. The BOM calculator 460 retrieves this information from the at least one memory 450, and also retrieves information about the individual materials in the system-level schematic, or any schematic block thereof, from the integrator module 440, or from the appropriate database in the memory 450. The BOM calculator 460 then computes the total cost of the materials and displays this information, through the interface 410, in a bill of material report. The bill of material report may also display the total quantity of each type of material required for purchase to manufacture the system as a whole, or to manufacture individual blocks thereof. The bill of material report may also divide both quantity and cost of the system-level schematic, or other high-level schematic block, by its lower-level blocks, along with "totals" for the entire high-level schematic block.

If a variant overlay changes the costs or quantity, the BOM calculator 460 may account for this. The applicable variant overlay for the schematic or schematic block is retrieved from the integrator module 440, or from the appropriate database in the memory 450. The variant overlay is then checked for parameter values that would alter the cost and/or quantity of the materials. Most such cases will involve a component presence or component designation parameter value—for instance, one of the Type A chips may be replaced with a Type C chip, or marked as Do Not Install, in either case changing the number of Type A chips required—although other parameter changes might also alter the cost of the materials in special cases. The BOM calculator 460 then outputs a new bill of material report reflecting these changes, either by making a complete report from the combination of block and overlay, or by starting with an existing report from the block and making changes according to the overlay (e.g., removing a Type A chip and adding a Type C chip to the existing calculations).

The BOM calculator 460 may further provide comparison reports, such that the materials and cost for the root schematic and a variant schematic, or two variant schematics, may be compared. With this feature in mind, a design team may use embodiments of the invention to develop variants based not on different design requirements, but simply for the purpose of comparing two similar, equally valid designs in terms of cost of production.

Figure 4B:
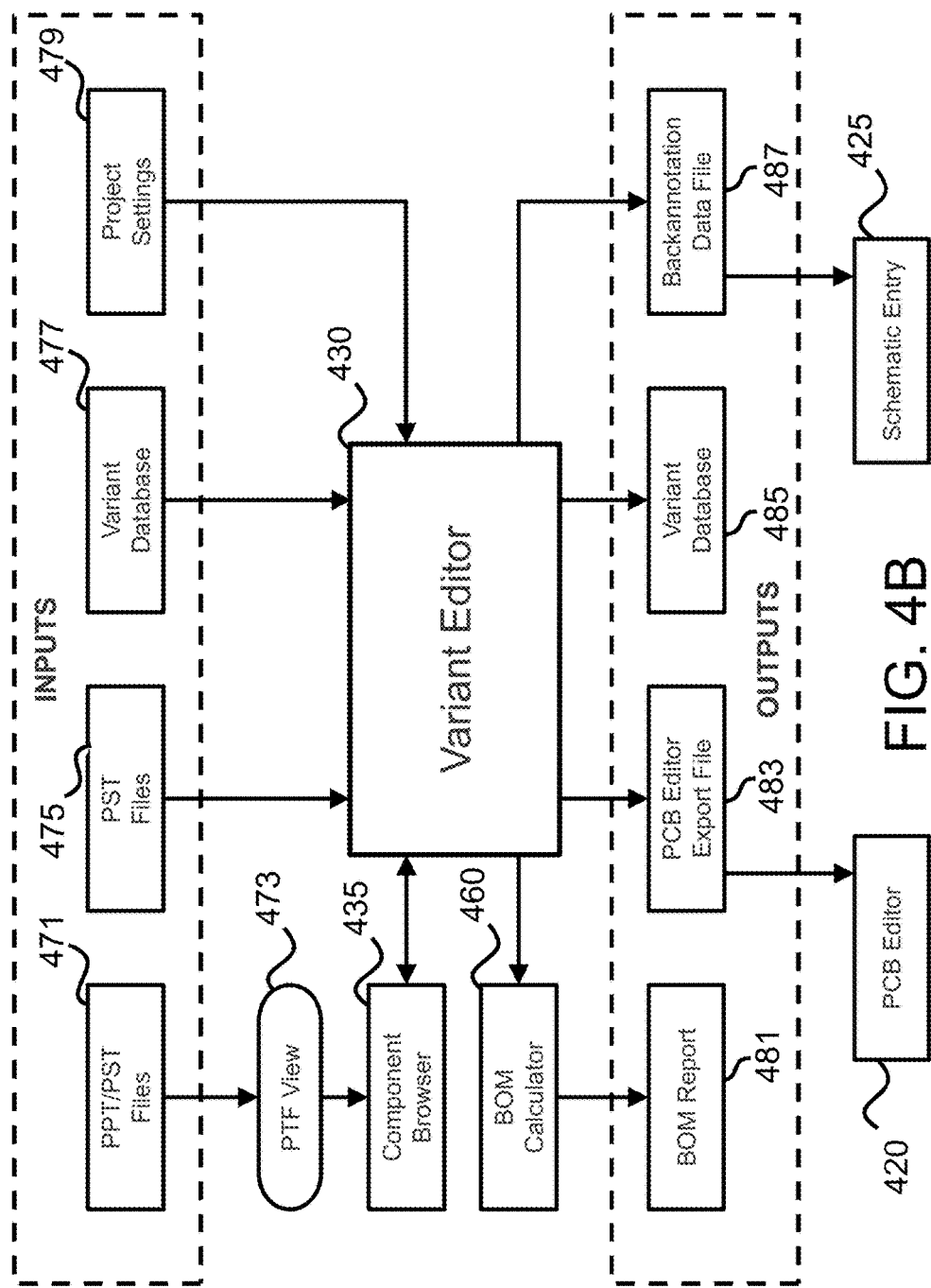
FIG. 4B is a block diagram illustrating a system for generating and editing a system variant overlay for a printed circuit board design process, according to an embodiment of the invention.

FIG. 4B depicts an illustrative system implementing the subject method, the depiction focusing on the inputs and outputs of the variant editor 430, according to an exemplary embodiment of the invention. This exemplary embodiment is specifically in the context of a printed circuit board (PCB) design process, but will use the same labels as FIG. 4A where applicable.

In the illustrated embodiment, Physical Part Table (PPT) and Packager State (PST) files 471, either from the schematic editor 420 or databases in the memory 450, provide a general netlist definition and a table of components. More specifically, PPT files provide properties of the physical components of a circuit in the form of a database, and PST files provide the netlists for the schematic and its blocks. The PPT and PST files are combined into a Part Table (PTF) view file 473, which defines the available components with their respective netlists, and may be substituted for one or both of the PPT and PST files.

A component browser 435 interfaces with the variant editor 430 to allow the browsing and selection of these components from the PTF view file 473, allowing the variant editor 430 to include variant values for component designation parameters, or even use an entire component definition as a variant parameter value. The component browser 435 may also interface with other modules in the system.

The variant editor 430 more directly receives netlist data files 475, which as depicted are PST files, and which supply netlists for the block or blocks being considered by the variant editor 430. If PST files, these may be the same PST files as those combined with the PST files 471 into the PTF view file 473. The variant editor 430 also receives a variant database 477 which defines different variant overlays and variant parameter values, for editing in the variant editor 430. The variant editor 430 also receives a project settings file 477, which provides project settings such as user preferences, hierarchy configuration, and other project setup data to the variant editor 430.

The variant editor 430 interacts with a BOM calculator 460. The BOM calculator 460 may take the DAT files 475 and the presently edited variant data from the variant editor 430 to compute and output a BOM report 481, as described for FIG. 4A.

The variant editor 430 outputs a variant export file 483 for the schematic editor 420. In the depicted embodiment, the schematic editor 420 is a PCB editor, and the variant export file 483 is a PCB editor export file. The schematic editor 420 applies the export file as an available variant for the appropriate schematic block. As a PCB editor, the schematic editor 420 also manages and edits the layout, such as component placement and routing, of the schematic blocks themselves.

The variant editor 430 also outputs an amended variant database 485, which is the variant database 477 with changes to included new or edited variants. This amended variant database 485 is saved to the memory 450 or another memory as desired.

The variant editor 430 also outputs a back-annotation data file 487, which defines resistance and capacitance. This back-annotation data file 487 is provided to a schematic entry module 425, which is used to define the netlist of a schematic or schematic block. Using a back-annotation data file 487 which includes variant parameter values of resistance and capacitance, the schematic entry module 425 may design an updated schematic netlist specifically for the variant to use for timing analysis and other purposes.

Although FIG. 4B depicts particular file types and formats, those of skill in the art will be able to substitute other formats providing the same or similar function without departing from the scope of the invention.

The system may comprise a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) may also be developed to perform these functions.

Figure 5:
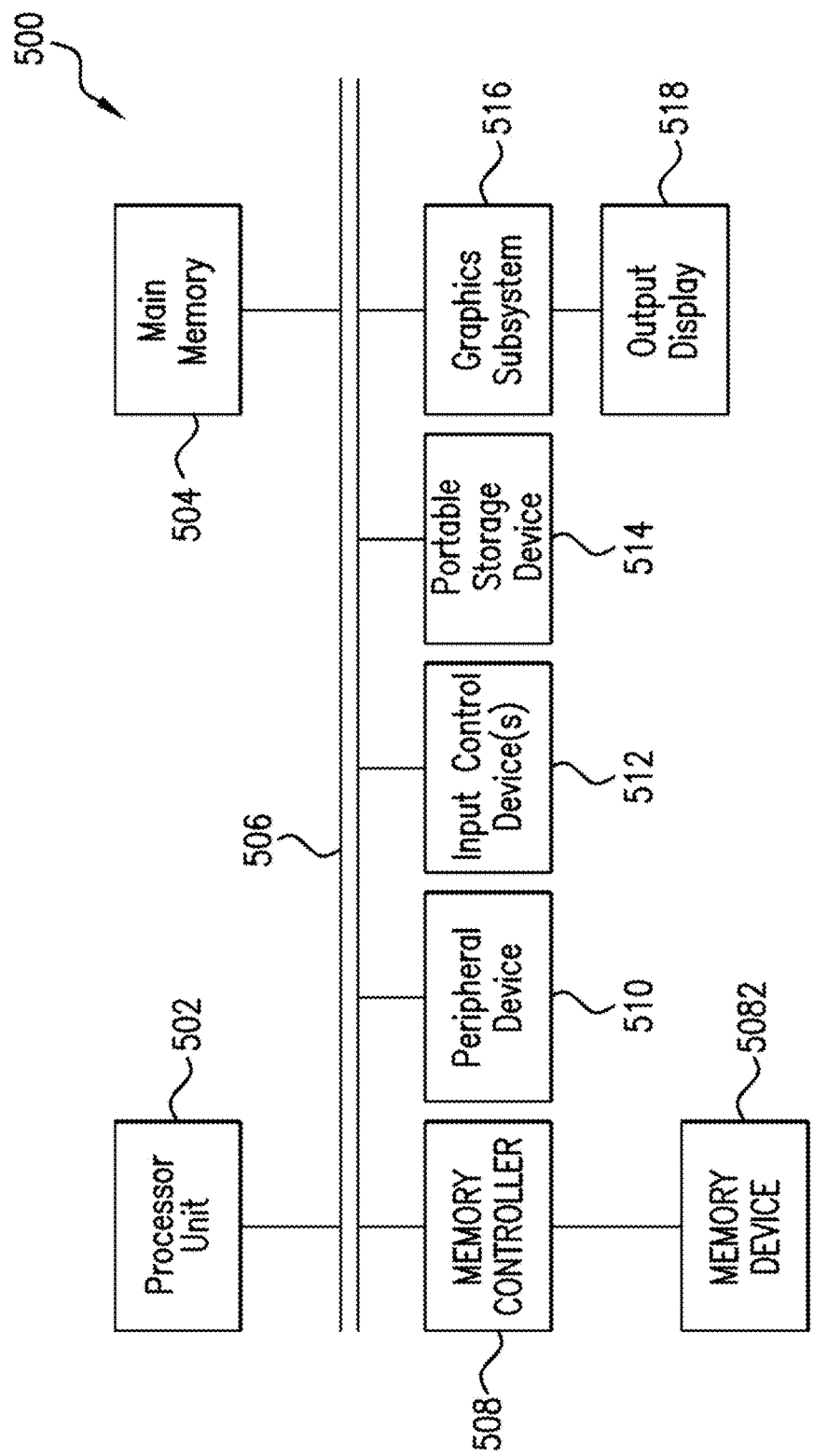
FIG. 5 is a block diagram illustrating an exemplary computer system for programmatic and/or hardware implementation in various embodiments of the disclosed system and method.

As an example, FIG. 5 is a block diagram illustrating an exemplary computer system for programmatic and/or hardware implementation of various aspects of the disclosed system and method. For instance, it may serve as a host for such hardware modules, and/or as a host for executing software modules such as EDA tools/simulations/emulation/firmware, in accordance with various configurations of the disclosed system and method.

A computer system 500 contains: a processor unit 502, a main memory 504, an interconnect bus 506, a memory controller 508 that is coupled to a memory device 5082, peripheral device(s) 510, input control device(s) 512, portable storage medium drive(s) 514, a graphics subsystem 516, and an output display 518. Processor unit 502 may include a single microprocessor or a plurality of microprocessors for configuring computer system 500 as a multi-processor system. Main memory 504 stores, in part, instructions and data to be executed by processor unit 502. Main memory 504 preferably includes banks of dynamic random access memory (DRAM) as well as high-speed cache memory.

For the purpose of simplicity, the components of computer system 500 are connected via interconnect bus 506. However, computer system 500 may be connected through one or more data transport means. For example, processor unit 502 and main memory 504 may be connected via a local microprocessor bus; and memory controller 508, peripheral device(s) 510, portable storage medium drive(s) 514, and graphics subsystem 516 may be connected via one or more input/output (I/O) buses. Memory device 5082 may be implemented as a nonvolatile semiconductor memory for storing data and instructions to be used by processor unit 502. Memory device 5082 may store the software to load it to the main memory 504 or may be represented in an EDA tool simulation by suitable classes (incorporating data structures and functions operable upon the data structures) or the like as would be known to one of skill in the art.

Portable storage medium drive 514 operates to input and output data and code to and from the computer system 500. In one configuration, the software is stored on such a portable medium, and is input to computer system 500 via portable storage medium drive 514. Peripheral device(s) 510 may include any type of computer support device such as an input/output (I/O) interface, to add additional functionality to computer system 500. For example, peripheral device(s) 510 may include a network interface card, to interface computer system 500 to a network. Peripheral device(s) may also include a memory controller and nonvolatile memory.

Input control device(s) 512 provide a portion of the user interface for a computer system 500 user. Input control device(s) 512 may include an alphanumeric keypad for inputting alphanumeric and other key information; and a cursor control device such as a mouse, a trackpad or stylus; or cursor direction keys.

In order to display textual and graphical information, computer system 500 contains graphics subsystem 514 and output display(s) 518. Output display 518 may include a cathode ray tube (CRT) display, liquid crystal display (LCD), plasma, or active matrix organic light emitting diode (AMOLED) display. Graphics subsystem 516 receives textual and graphical information, and processes the information for output to display 518.

Figure 6A:
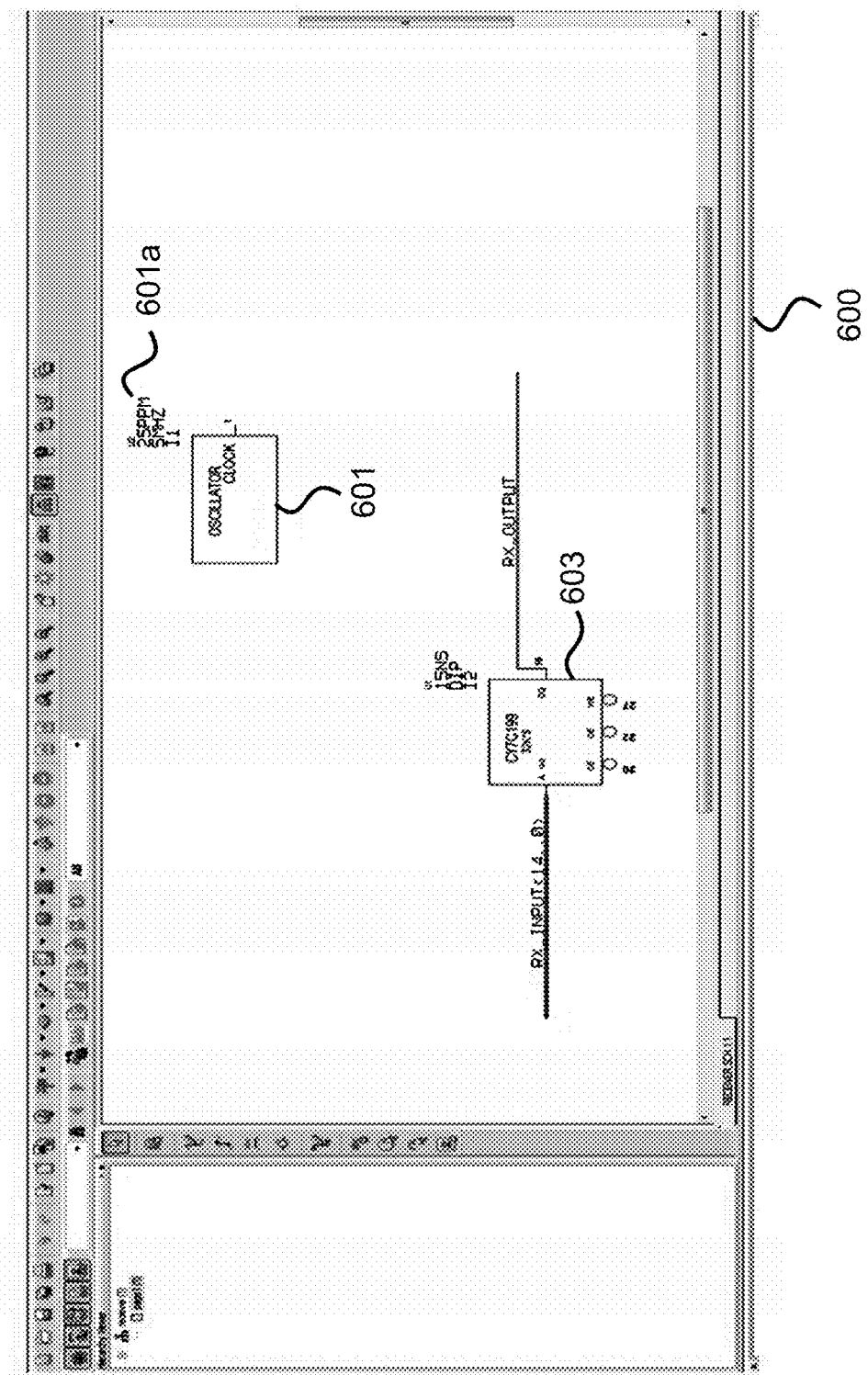
FIGS. 6A through 6C are screenshots of an exemplary software implementation in various embodiments of the disclosed system and method.
Figure 6B:
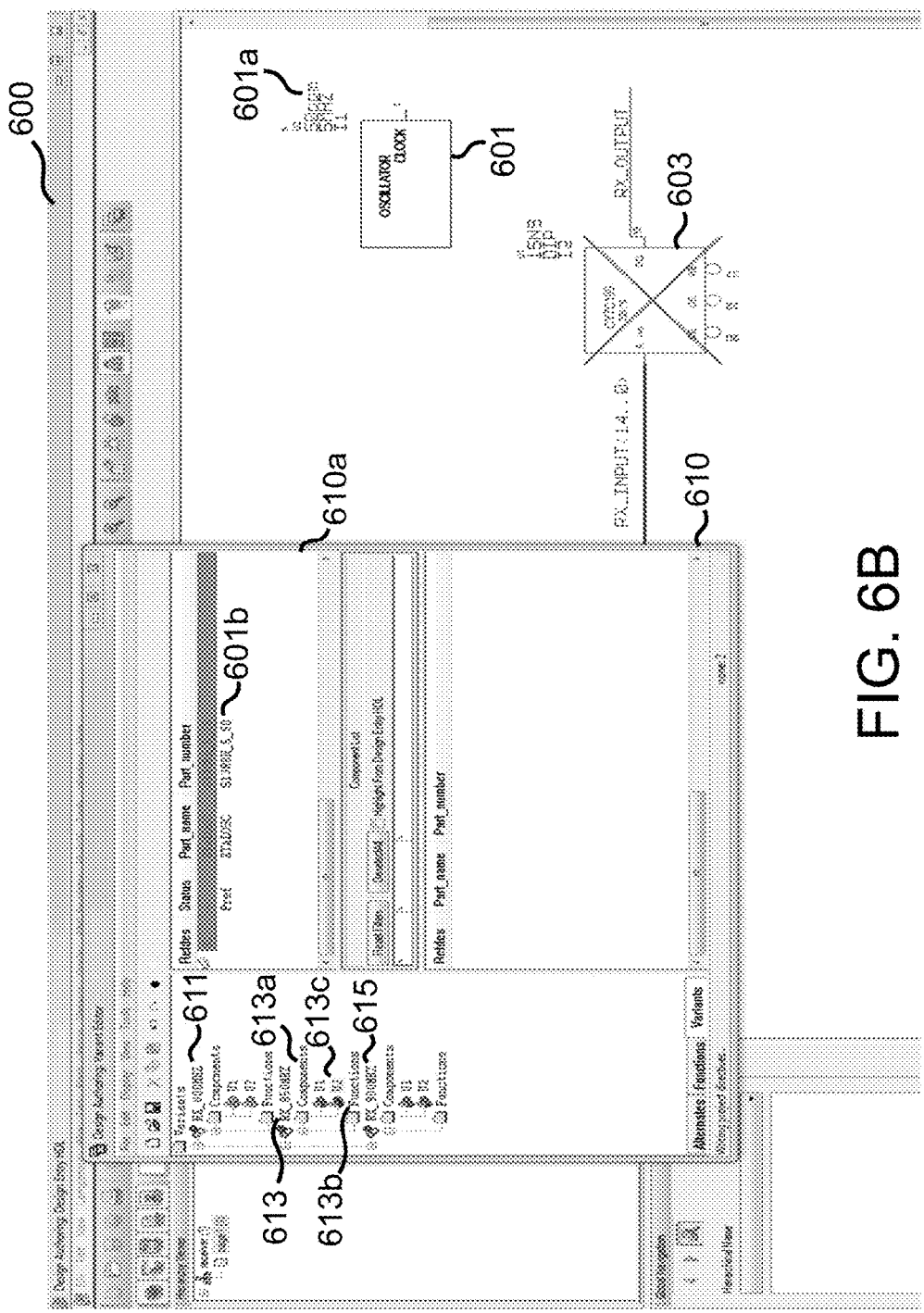
Figure 6C:
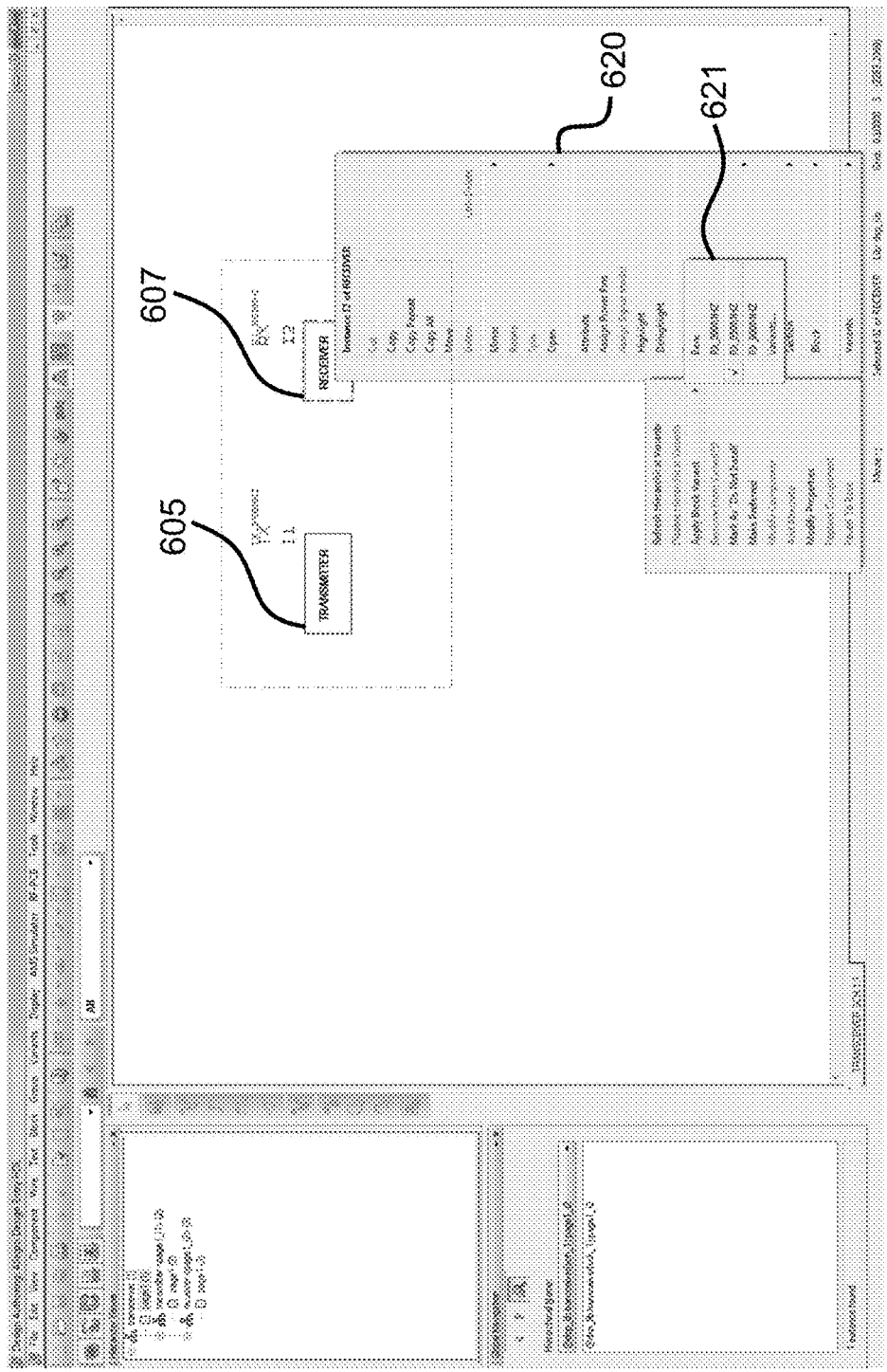

FIGS. 6A through 6C are screenshots of displays generated during sample operation of an exemplary implementation of the illustrated system. In this example, a transceiver, similar to the transceiver branch 110 of the example system of FIG. 1A, is examined, and the variant sets of design requirements each define a transmission frequency of transmissions which will be received and transmitted by the transceiver.

In FIG. 6A, primary window 600 displays a simple schematic of a receiver with two components 601 and 603, each with various parameter values displayed, such as a clock accuracy parameter value 601a for component 601, which is set to 25 PPM.

In FIG. 6B, a variant window 610 has been opened. Variants 611, 613, and 615 are shown and selectable in variant window 610. It is noted that the file name of the variant overlay designates both a schematic block (in the present example, all "RX," designating for the receiver) and a variant set of design requirements (in the present example, various values of MHz, presumably indicating a signal frequency). Each variant as displayed in variant window 610 includes a list of components 613a in the receiver, which may be directly selected to see the variant parameter values corresponding to the components. Each variant also includes a "function" list 613b which defines which components, if any, are linked such that they must be altered or removed together; in the present example, no functions are defined for any of the variants.

Variant 613, labeled "RX_850MHZ," is presently selected in variant window 610. It is noted that clock accuracy parameter value 601a has changed to 50 PPM, and the value text is a different color in the interface to highlight this change. Additionally, component 603 is now crossed out, indicating a Do Not Install value for its component presence parameter. Variant window 610 also more specifically has component "U2" 613c selected, corresponding to component 601, and it can be seen in the sub-window 610a that this variant overlay also includes a component designation variant parameter value 601b for component 601.

In FIG. 6C, primary window 600 now depicts a transceiver including both the receiver 607 and a transmitter 605. The receiver 607 is labeled as applying the RX_850MHZ variant overlay, and the transmitter 605 is labeled as applying a TX_850MHZ variant overlay. A pop-up menu 620 has resulted from selecting the receiver 607, and the option to change the applicable variant is presented in a sub-menu 621. The present designer, who is presumed to be an integrator for the transceiver, may thereby examine the operation of the transceiver under either variant.

As previously noted, in some embodiments the pre-merged variant overlays are not required to match in the post-merged overlay, and therefore the transceiver integrator for the transceiver may change, for example, the receiver 607 to apply another variant such as an RX_900MHZ variant overlay, without changing the variant overlay for the transmitter 605 to a corresponding TX_900MHZ variant overlay. The transceiver integrator may then save the result as a new transceiver variant overlay which does not universally apply either the 850 MHz design requirement or the 900 MHz design requirement.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method steps may be substituted for those specifically shown and described, and certain features may be used independently of other features, and all or some of the above embodiments may be selectively combined with each other, and in certain cases, particular locations of elements or sequence of method steps may be reversed or interposed, all without departing from the spirit or scope of the disclosed system and method as defined in the appended claims. The scope should therefore be determined with reference to the description above and the appended claims, along with their full range of equivalents.

What is claimed is:

1. A system for adapting a root system-level schematic representation of an electronic system to at least one variant set of design requirements, the root system-level schematic hierarchically defining a plurality of base-level schematic blocks each including at least one component and at least one parameter, the system comprising:
   a variant editor executable to generate a plurality of block variant overlays, each block variant overlay associated with one of the variant sets of design requirements and one of the base-level schematic blocks of the root system-level schematic, each block variant overlay defining at least one variant parameter value for the associated base-level schematic block according to the associated variant set of design requirements;
   an integrator module executable to:
      merge the block variant overlays associated with the same variant set of design requirements to generate a system variant overlay, the system variant overlay including all variant parameter values of the merged block variant overlays, the system variant overlay being associated with the variant set of design requirements, and
      assign the variant parameter values of the system variant overlay to the corresponding parameters of the root system-level schematic to generate a variant system-level schematic associated with the variant set of design requirements; and
   at least one memory defining at least one system-level variant database storing the system variant overlays.

2. The system of claim 1, wherein the at least one memory is further configured to store, for each base-level schematic block, a combined block variant database containing the block variant overlays associated with the base-level schematic block.

3. The system of claim 1, wherein the at least one memory is further configured to store, for at least one base-level schematic block, a plurality of distributed block variant databases each assigned to one of the variant sets of design requirements, each distributed block variant database containing at least one block variant overlay associated with the base-level schematic block and the assigned variant set of design requirements.

4. The system of claim 1, wherein the at least one system-level variant database includes a plurality of distributed system-level variant databases each assigned to one of the variant sets of design requirements, each distributed system-level variant database containing at least one system variant overlay associated with the assigned variant set of design requirements.

5. The system of claim 1, wherein:
   the root system-level schematic is hierarchically divided into at least one intermediate level of a plurality of intermediate-level schematic blocks, at least one intermediate-level schematic block hierarchically divided into a plurality of base-level schematic blocks; and the integrator module is further executable to:
   merge block variant overlays sharing an association with a variant set of design requirements and associated with a base-level schematic block of a shared intermediate-level schematic block to generate an intermediate variant overlay, the intermediate variant overlay including all variant parameter values of the merged block variant overlays, the intermediate variant overlay associated with the variant set of design requirements and the shared intermediate-level schematic block, and
   merge intermediate variant overlays sharing an association with a variant set of design requirements to generate a system variant overlay, the system variant overlay including all variant parameter values of the merged intermediate-level variant overlays, the system variant overlay associated with the variant set of design requirements.

6. The system of claim 5, wherein the integrator module is further executable to assign parameter values of an intermediate variant overlay to the corresponding parameters of an associated intermediate-level schematic block to generate a variant intermediate-level schematic block associated with the variant set of design requirements.

7. The system of claim 5, wherein the at least one memory is further configured to store, for each intermediate-level schematic block, a combined intermediate variant database containing the intermediate variant overlays associated with the intermediate-level schematic block.

8. The system of claim 5, wherein the at least one memory is further configured to store, for at least one intermediate-level schematic block, a plurality of distributed intermediate variant databases each assigned to one of the variant sets of design requirements, each distributed intermediate variant database containing at least one intermediate variant overlay associated with the intermediate-level schematic block and the assigned variant set of design requirements.

9. A system for generating a plurality of system-level schematics representation of electronic systems, the system-level schematics sharing a hierarchy defining a plurality of base-level schematic blocks, each system-level schematic adapted to one of a plurality of variant sets of design requirements, the system comprising:
   a schematic editor executable to generate a plurality of base-level schematic block shared by the plurality of system-level schematics, each base-level schematic block including at least one component and at least one parameter;
   a variant editor executable to generate a plurality of block variant overlays, each block variant overlay associated with one of the variant sets of design requirements and one of the base-level schematic blocks of the system-level schematics, each block variant overlay defining at least one variant parameter value for the associated base-level schematic block according to the associated variant set;
   an integrator module executable to:
      integrate the base-level schematic blocks to generate a root system-level schematic including the components of each of the base-level schematic blocks,
      merge the block variant overlays associated with the same variant set of design requirements to generate a system variant overlay, the system variant overlay including all variant parameter values of the merged block variant overlays, the system variant overlay being associated with the variant set of design requirements, and assign the parameter values of the system variant overlay to the corresponding parameters of the root system-level schematic to generate a variant system-level schematic associated with the variant set of design requirements; and at least one memory defining at least one system-level variant database storing the system variant overlays.

10. The system of claim 9, wherein:
the hierarchy of the system-level schematics includes at least one intermediate level of a plurality of intermediate-level schematic blocks, at least one intermediate-level schematic block hierarchically divided into a plurality of base-level schematic blocks; and
the integrator module is further executable to:
merge block variant overlays sharing an association with a variant set of design requirements and associated with a base-level schematic block of a shared intermediate-level schematic block to generate an intermediate variant overlay, the intermediate variant overlay including all variant parameter values of the merged block variant overlays, the intermediate variant overlay associated with the variant set of design requirements and the shared intermediate-level schematic block, and
merge intermediate variant overlays sharing an association with a variant set of design requirements to generate a system variant overlay, the system variant overlay including all variant parameter values of the merged intermediate-level variant overlays, the system variant overlay associated with the variant set of design requirements.

11. The system of claim 10, wherein the integrator module is further executable to assign parameter values of an intermediate variant overlay to the corresponding parameters of an associated intermediate-level schematic block to generate a variant intermediate-level schematic block associated with the variant set of design requirements.

12. A method for adapting a root system-level schematic representation of an electronic system to at least one variant set of design requirements, the root system-level schematic hierarchically defining a plurality of base-level schematic blocks each including at least one component and at least one parameter, the method comprising:
generating at least one block variant overlay associated with one of the variant sets of design requirements and one of the base-level schematic blocks of the system-level schematic, the block variant overlay defining at least one variant parameter value for the associated base-level schematic block according to the associated variant set of design requirements;
merging the at least one block variant overlay associated with the variant set of design requirements to generate a system variant overlay, the system variant overlay including all variant parameter values of the merged block variant overlays, the system variant overlay being associated with the variant set of design requirements; and
assigning the parameter values of the system variant overlay to the corresponding parameters of the root system-level schematic to generate a variant system-level schematic associated with the variant set of design requirements.

13. The method of claim 12, wherein:
the at least one variant set of design requirements includes a first variant set and a second variant set;
at least one first block variant overlay is generated according to the first variant set;
at least one second block variant overlay is generated according to the second variant set;
the at least one first block variant overlay is merged to form a first system variant overlay;
the at least one second block variant overlay is merged to form a first system variant overlay;
the parameter values of the first system variant overlay are assigned to the corresponding parameters of the root system-level schematic to generate a first variant system-level schematic associated with the first variant set; and
the parameter values of the second system variant overlay are assigned to the corresponding parameters of the root system-level schematic to generate a second variant system-level schematic associated with the second variant set.

14. The method of claim 12, wherein:
the root system-level schematic is hierarchically divided into at least one intermediate level of a plurality of intermediate-level schematic blocks, at least one intermediate-level schematic block hierarchically divided into a plurality of base-level schematic blocks;
the at least one block variant overlay includes at least one first block variant overlay associated with a first base-level schematic block of a first intermediate-level schematic block, and at least one second block variant overlay associated with a second base-level schematic block of a second intermediate-level schematic block; and
the merging of the at least one block variant overlay includes:
merging the at least one first block variant overlay for the variant set of design requirements to generate a first intermediate variant overlay, the first intermediate variant overlay including all variant parameter values of the merged first block variant overlays, the first intermediate variant overlay associated with the variant set of design requirements and the first intermediate-level schematic block,
merging the at least one second block variant overlay for the variant set of design requirements to generate a second intermediate variant overlay, the second intermediate variant overlay including all variant parameter values of the merged second block variant overlays, the second intermediate variant overlay associated with the variant set of design requirements and the second intermediate-level schematic block, and
merging at least the first and second intermediate variant overlays for the variant set of design requirements to generate a system variant overlay, the system variant overlay including all variant parameter values of the merged intermediate variant overlays, the system variant overlay associated with the variant set of design requirements.

15. The method of claim 12, wherein at least one parameter value defined by the system variant overlay is a component presence.

16. The method of claim 12, wherein at least one parameter value defined by the system variant overlay is a component designation.

17. The method of claim 12, wherein at least one parameter value defined by the system variant overlay is a frequency value of a component.

18. The method of claim 12, wherein at least one parameter value defined by the system variant overlay is a capacitance value of a component.

19. The method of claim 12, wherein each variant set of design requirements defines a supply voltage to the electronic system.

20. The method of claim 12, wherein each variant set of design requirements defines an apparatus category for installation of the electronic system.

* * * * *